(12) United States Patent
Chiba (10) Patent No.: US 7,218,246 B2
(45) Date of Patent: May 15, 2007

(54) MAP DISPLAY DEVICE AND PROGRAM THEREFOR

(75) Inventor: Wataru Chiba, Okazaki (JP)

(73) Assignee: Aisin Aw Co., Ltd., Anjo-shi (JP)

( * ) Notice: Subject to any disclaimer, the term of this patent is extended or adjusted under 35 U.S.C. 154(b) by 80 days.

(21) Appl. No.: 10/722,137

(22) Filed: Nov. 26, 2003

(65) Prior Publication Data

US 2004/0164877 A1    Aug. 26, 2004

(30) Foreign Application Priority Data

Nov. 29, 2002    (JP) ............................. 2002-349216

(51) Int. Cl.
*G08G 1/123*    (2006.01)
(52) U.S. Cl. ............ 340/990; 340/995.16; 340/995.18; 701/208
(58) Field of Classification Search ... 340/990–995.25; 701/208–212
See application file for complete search history.

(56) References Cited

U.S. PATENT DOCUMENTS

| | | | |
|---|---|---|---|
| 5,191,532 A | 3/1993 | Moroto et al. ............... | 364/449 |
| 5,819,200 A | 10/1998 | Tamai et al. ................. | 701/208 |
| 5,839,088 A * | 11/1998 | Hancock et al. ............ | 701/213 |
| 6,836,822 B1 * | 12/2004 | Hatano et al. ............... | 711/117 |

FOREIGN PATENT DOCUMENTS

JP        08-304099        11/1996

OTHER PUBLICATIONS

Li Heyuan et al, "The Design and Impletation of GIS Based on Internet", *Surveying and Mapping in Shanxi*, Dec. 2002, pp. 21(?), 22 and 24, vol. 9, Nos. 3-4 (China).

* cited by examiner

*Primary Examiner*—Daniel Wu
*Assistant Examiner*—Jennifer Mehmood
(74) *Attorney, Agent, or Firm*—Bacon & Thomas, PLLC (57) ABSTRACT

An object of the present invention is to provide a map display device that makes full use of historic records of the input addresses of previously retrieved points, thereby simplifying the process for inputting an address of a point near a previously retrieved point and thereby facilitating easy point retrieval. The map display device for retrieving a point at an input address and for displaying a map that covers the retrieved point includes storage means for storing historic records of the input addresses of the previously retrieved points in a hierarchy of administrative district levels, and a control means for displaying an input page through which an address is input on an administrative hierarchical basis as well as for displaying an administrative district name of a previously retrieved point as a hierarchy of administrative levels or item fields.

15 Claims, 11 Drawing Sheets

FIG. 1

INITIAL INPUT PAGE

"ADMINISTRATIVE DIVISIONS OF JAPAN"   "AICHI-PREFECTURE"
"CITIES, TOWNS, AND VILLAGES"         "NAGOYA-CITY"
"WARDS"                                "MIDORI-WARD"
"OOAZA, OR LARGE HAMLET"               "AOYAMA"
"KOAZA / CHO-ME, OR SMALL HAMLET"      "1-CHROME"
"BANCHI, OR HOUSE NUMBER"              "123-45"

FIG.2A

CHANGE FROM THE INITIAL INPUT PAGE
— ITEM INPUT PAGE

INITIAL INPUT PAGE

"ADMINISTRATIVE DIVISIONS OF JAPAN"   | "AICHI-PREFECTURE"
"CITIES, TOWNS, AND VILLAGES"         | "NAGOYA-CITY"
"WARDS"                                | "MIDORI-WARD"
"OOAZA, OR LARGE HAMLET"               | "AOYAMA"
"KOAZA / CHO-ME, OR SMALL HAMLET"      | "1-CHROME"
"BANCHI, OR HOUSE NUMBER"              | "123-45"

THE RIGHT SIDE OF THE ITEM INPUT PAGE IS ALLOCATED FOR A DESCRIPTION IE, "NAMES" OF ADMINISTRATIVE DISTRICTS AND DIFFERENT LEVELS

FIG.2B

INITIAL INPUT PAGE

"ADMINISTRATIVE DIVISIONS OF JAPAN"   "AICHI-PREFECTURE"
"CITIES, TOWNS, AND VILLAGES"         "NAGOYA-CITY"
"WARDS"                                "MIDORI-WARD"
"OOAZA, OR LARGE HAMLET"               "AOYAMA"
"KOAZA / CHO-ME, OR SMALL HAMLET"      "1-CHROME"
"BANCHI, OR HOUSE NUMBER"              "123-45"

1 ADMINISTRATIVE DISTRICT ITEM FIELD 1
2 ADMINISTRATIVE DISTRICT ITEM FIELD 2
3 ADMINISTRATIVE DISTRICT ITEM FIELD n

| | | | | |
|---|---|---|---|---|
| 7 | AICHI-PREFECTURE | NAGOYA-CITY | MIDORI-WARD | AOYAMA | 123-45 |
| 6 | AICHI-PREFECTURE | NAGOYA-CITY | MINAMI-WARD | AKAYAMA | 56 |
| 5 | AICHI-PREFECTURE | OKAZAKI-CITY | NAKAMATSU-WARD | OKAYAMA | 5-6 |
| 4 | AICHI-PREFECTURE | NAGOYA-CITY | MINAMI-WARD | KIYAMA | SHIRAI 44 |
| 3 | AICHI-PREFECTURE | OKAZAKI-CITY | OKA-CHO | HARAYAMA | 6-18 |
| 2 | AICHI-PREFECTURE | ANJO-CITY | FUJII-CHO | TAKANE | 10 |
| 1 | SHIZUOKA-PREFECTURE | HAMAMATSU-CITY | SHIRA-CHO | KUROYAMA | 78 |

MAP DISPLAY DEVICE AND PROGRAM THEREFOR

The disclosure of Japanese Patent Application No. 2002-349216 filed on Nov. 29, 2002 including the specification, drawings and abstract are incorporated herein by reference in their entirety.

CROSS-REFERENCE TO RELATED APPLICATION

This application claims, under 35 USC 119, priority of Japanese Application No. 2002-349216 filed Nov. 29, 2002.

BACKGROUND OF THE INVENTION

1. Field of the Invention

The present invention relates to a map display device and to a program therefor.

2. Description of the Related Art

Conventional vehicle map display devices (navigation devices) allow a destination to be set by input of an address. Some conventional map display devices retrieve a destination by inputting an address of the destination as a hierarchical series of inputs, i.e., on an administrative district-to-district basis in decreasing order of district size, for example: Administrative divisions of Japan (the Tokyo metropolitan area, Hokkaido, and other prefectures) → Municipalities (Cities, Wards, Towns and Villages) → Large hamlets ("Ooaza"—a large collection of dwellings) → Small hamlets ("Koaza"—a small collection of dwellings) → House number. Every inputted address of a retrieved point is stored as a historic record of past inputted addresses. The historic record of the inputted addresses of previously retrieved points are presented to the user in the form of a list. This list simplifies the process of point retrieval where the user wishes to retrieve a point previously retrieved.

U.S. Pat. No. 5,819,200 discloses a map display device which allows the user to retrieve a point slightly distanced from a previously retrieved point having an address listed in the historic record of inputted addresses of the previously retrieved points. In this prior art system the point closest to his/her desired point is selected from the list, and a scrollable map that covers the desired point is displayed.

For retrieving a new point, the conventional map display device requires the user to input an address of the new point on an administrative district-to-district basis; from the broadest administrative division down to a house number. In other words, the user must input an address on a different input display (page) for each level of the hierarchy of addresses. This is time-consuming and bothersome. This problem becomes worse when the new point has an address similar to the address of a previously retrieved point. Regardless of the similarity between the address of the new point and the address of a previously retrieved point, the conventional map display device requires the user to input the address of the new point from the beginning by selecting each administrative district in decreasing order of district size, which is wasteful of the user's time.

SUMMARY OF THE INVENTION

In order to solve the foregoing problems, the present invention provides a map display device that makes full use of the historic records of the inputted addresses of the previously retrieved points and which simplifies the inputting of an address of a point located near the previously retrieved point, thereby facilitating point retrieval.

Accordingly, the present invention provides a map display device for retrieving a point at an inputted address and for displaying a map that covers the point retrieved for the inputted address, comprising: storage means for storing historic records of the inputted addresses of previously retrieved points in a hierarchy, i.e., on different administrative levels (administrative district-to-district basis); and control means for displaying an input page by which an address is input as a series of inputs in a hierarchical order, i.e., on an administrative district-to-district basis, and for displaying an administrative district name of a previously retrieved point at each level of the hierarchy as an administrative district item field.

Further, according to the present invention, there is another map display device for retrieving a point at an inputted address and for displaying a map that covers that retrieved point, comprising: storage means for storing information about the retrieved point; and control means for reading out historic records of the inputted addresses of previously retrieved points and for displaying them in the form of a list, wherein the address of the previously retrieved point is selected from the list and displayed in a Japanese syllables input page, and a previously retrieved point whose address was is in Japanese syllables using the input page.

Further, according to the present invention, there is provided a machine-readable medium encoded with a program for a map display device for retrieving a point at an inputted address and for displaying a map that covers the point retrieved for the inputted address, and encoded with historic records of the previously input addresses for retrieved points, arranged in a hierarchy of administrative district levels, wherein the program includes:

displaying an input page, presenting an administrative district name of a previously retrieved point as an administrative district item field, for input of an address as a hierarchy administrative districts at different levels.

In another embodiment the present invention provides a machine-readable medium encoded with a program for a map display device for retrieving a point at an inputted address and for displaying a map that covers the point retrieved for the inputted address and encoding information for the retrieved point, wherein the program includes:

retrieving historic records of input addresses of previously retrieved points;

displaying the retrieved historic records in the form of a list for selection of an address of a previously retrieved point from the list; and displayed a Japanese syllables input page, and further thereon the past-retrieved point whose selected address was set in the Japanese syllables input page is retrieved.

DESCRIPTION OF THE PREFERRED EMBODIMENTS

Preferred embodiments of the present invention will now be described in detail with reference to the accompanying drawings.

Figure 1:
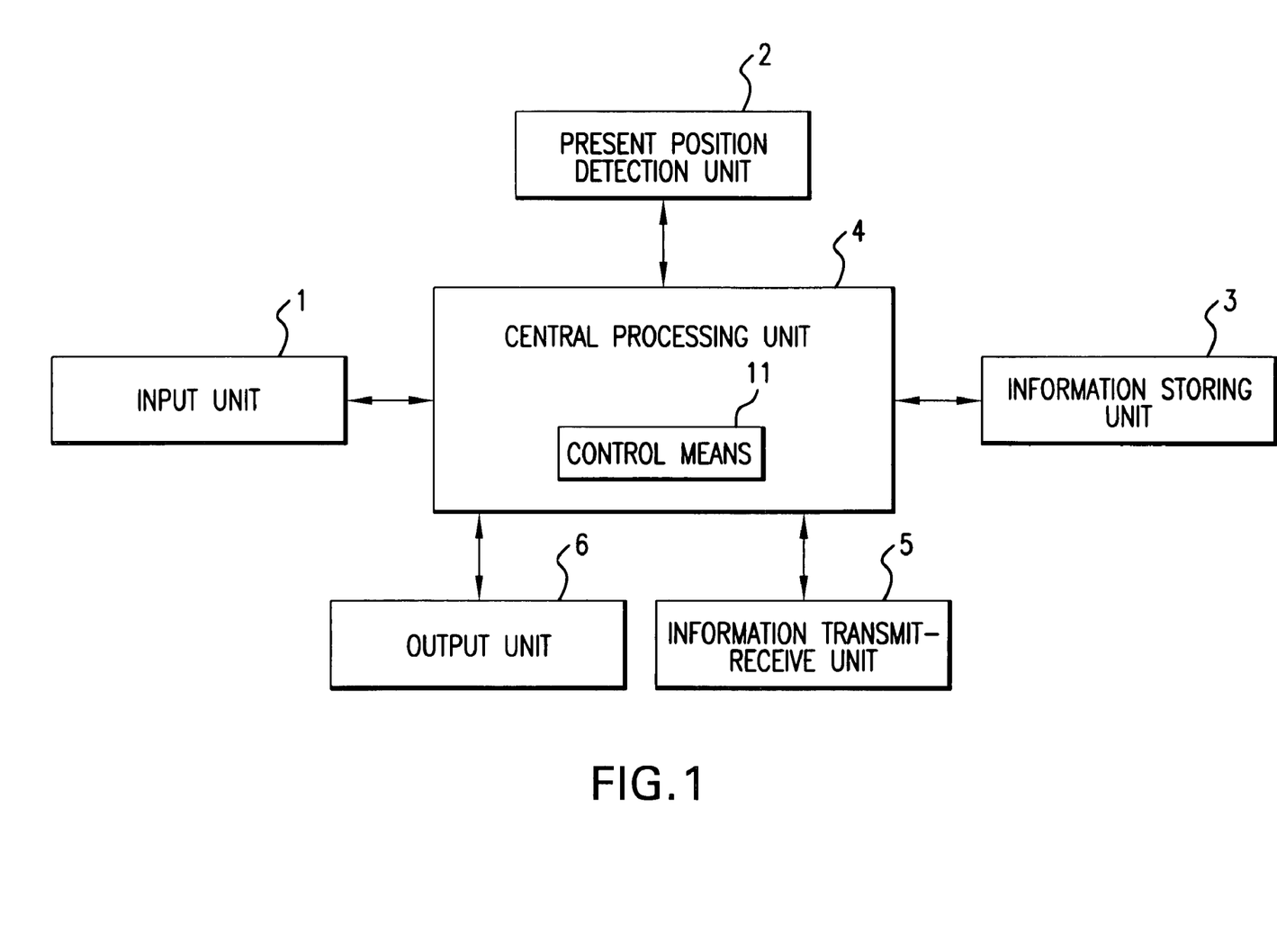
FIG. 1 is a block diagram of a map display device according to a preferred embodiment of the present invention.

FIG. 1 shows a preferred map display device as comprising: an input unit 1 which serves as selection means for inputting information, such as a departure point, a destination point, or the like, necessary for route guidance; a present position detection unit 2 for detecting present position of the vehicle; an information storage unit 3 for storing cartographic data used in drawing a map and in conducting a route search, guide data for visual/vocal route guidance, programs (i.e., applications and/or operating systems) for map display, route searching, vocal guidance, and the like; a central processing unit 4 serving as a navigation processing means for controlling all processes executed by the system, including map-display processing, route search processing and visual/vocal route guidance processing, by reading out the cartographic data from the information storing unit 3 or by temporarily storing the cartographic data read out from the unit 3; an information transmit-receive unit 5 for transmitting/receiving road information, traffic information, and detected information concerning the present position of the vehicle; and an output unit 6 for outputting the route guidance.

According to the present embodiment, the central processing unit 4 includes a control means 11 for displaying an input page from which an address is input as a hierarchical series of inputs (series of administrative levels) as well as for displaying an administrative district name of a previously retrieved point in an administrative district item field shown on the input page.

FIG. 2 illustrates an input page used in the embodiment of FIG. 1.

Figure 2A:
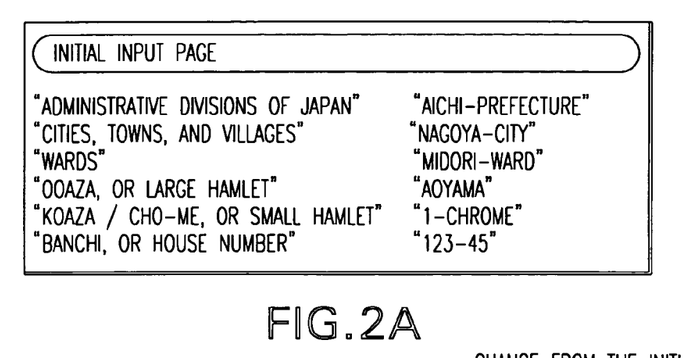
FIG. 2 illustrates an input page used in the embodiment of FIG. 1.
Figure 2B:
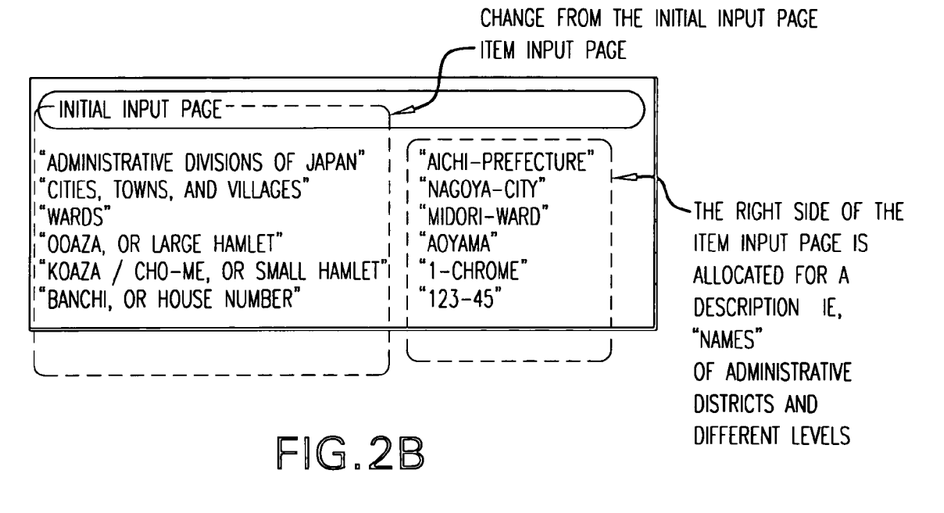
Figure 2C:
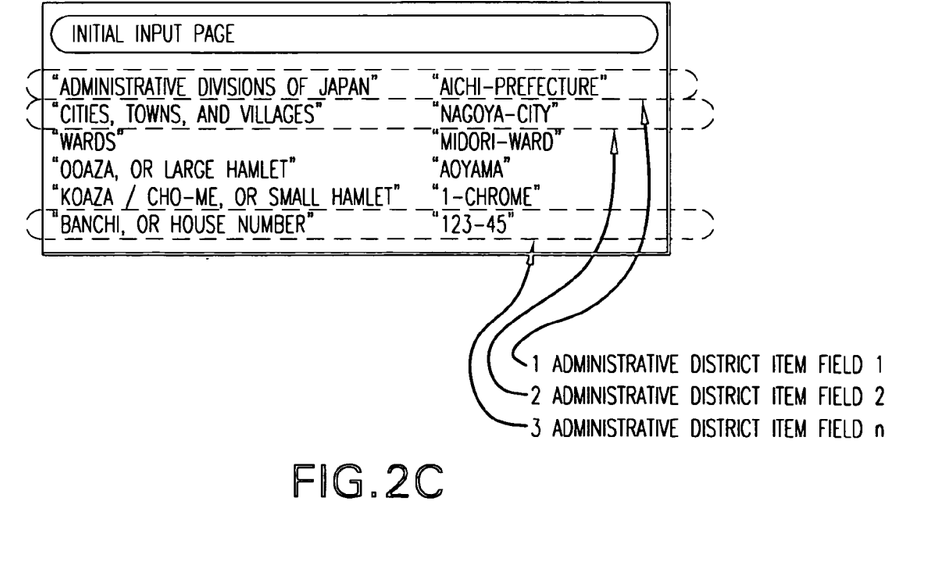

Upon selection of an address input menu from a menu page on the map display device, an input page is next displayed as shown in FIG. 2(a). The input page shows administrative district item fields; for example, from top to bottom, (1) "Administrative divisions of Japan" (the Tokyo metropolitan area, Hokkaido, and other prefectures), (2) "Cities, Towns and Villages", (3) "Wards", (4) "Ooaza, or a large hamlet," (a large collection of dwellings), (5) "Koaza/Cho-me, or a small hamlet" (a small collection of dwellings), (6) "Banchi, or House number." When any one of the hierarchical fields is clicked, the input page goes to an item input page for the selected level of the hierarchy (field), as shown in FIG. 2(b). The right side of the item input page is allocated for a description (i.e. name) of an administrative district. The administrative district names are preliminarily stored in the information storing unit 3. The number of the administrative district item fields (hierarchical levels) on the item input page ranges from 1 to n. In the present embodiment as shown in FIG. 2(c), the number of the fields is exemplified by n=6. When the administrative district field 1 is clicked, names of "Administrative divisions of Japan," stored preliminarily in the unit 3, are displayed in the form of a list in the order of the Japanese syllables. In FIG. 2(c), for example, Aichi-prefecture is selected from the list of "Administrative divisions of Japan" in the field 1. When the administrative district field 2 is clicked, names of "Cities, Towns, and Villages" are displayed in the form of a list in the order of the Japanese syllables. Then, the user is prompted to select his/her desired name from the list of "Cities, Towns, and Villages". Here, "Nagoya-city" is selected from the list for the field 2.

The foregoing embodiment, modified for use in the United States would have 3 or 4 administrative item fields, i.e., state/city/street address or state/city/zip code (or county)/street address. For example, where field 1 is clicked names of the different states would be displayed in the form of an alphabetical list. When field 2 is clicked, the names of cities within the selected state would be displayed in alphabetical order and when field 3 is clicked a screen for input of the street address would be displayed. Selection of a city (field 2) would be prompted in the same manner as described above.

As described above, a click on a administrative district item field produces a list of administrative district names in that field (level) which are stored preliminarily in the information storing unit 3. This list gives the user an opportunity to voluntary select and input his/her desired administrative district. According to the present embodiment, every inputted address is cumulatively stored in the unit 3. Referring to such stored addresses of the retrieved points, as shown in FIG. 2(a), the input page in its initial state displays the administrative district name that was input last time or the administrative district name having been input the largest number of times.

Thus, it is possible to input an address using the input page in its initial state, without change of any administrative district name shown on the input page. Alternatively, using the input page in its initial state, it is possible to input an address by changing an administrative district name shown therein; for example, the address input may be effected by changing only names of "A large hamlet, or Ooaza" (a large collection of dwellings) "A small hamlet, or Koaza/Cho-me" (a small collection of dwellings), and "House number, or Banchi," while leaving unchanged names of "Administrative divisions of Japan" (the Tokyo metropolitan area, Hokkaido, and other prefectures), "Cities, Towns and Villages", and "Wards" as they are in their initial state.

Figure 3:
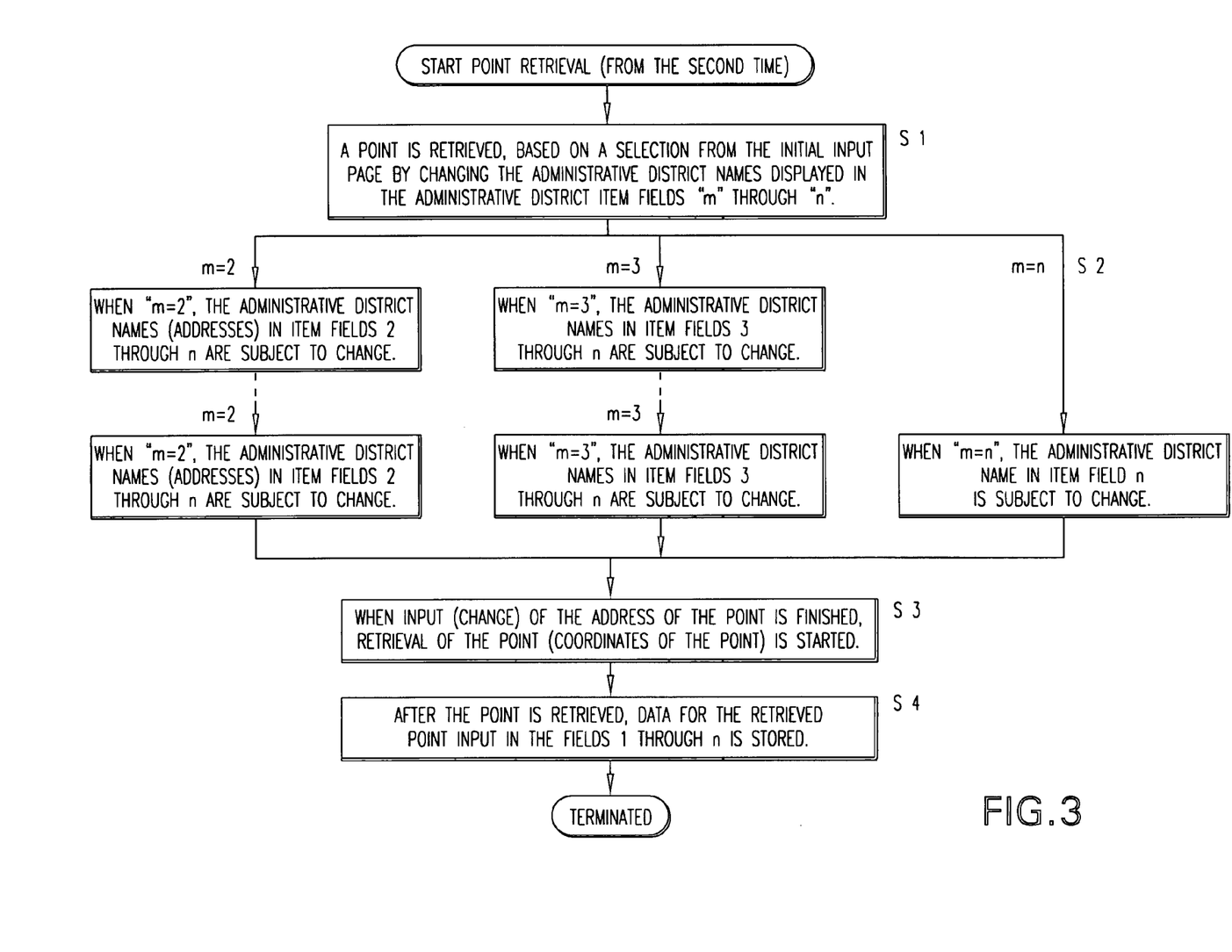
FIG. 3 is a flowchart of a process of point retrieval based on addresses according to the embodiment of FIG. 1.

FIG. 3 is a flowchart showing a process of point retrieval based on an address hierarchical structure according to the present embodiment. As previously described with reference to FIG. 2, the input page in its initial state shows the administrative district name that was input last time or the administrative district name input the largest number of times, from among other administrative district names of previously retrieved points. Therefore, when the user wants to retrieve a new point whose address is similar to the address of the previously retrieved point, the retrieval of the new point is done, based on the input page in its initial state, by changing the administrative district names shown in the administrative district item fields "m" through "n" (Step 1). More specifically, when "m"=2, the administrative district item fields 2 through n are subjected to name change. When "m"=3, the administrative district item fields 3 through n are subject to name change. When "m"=n, only the administrative district item field n is subject to name change (Step 2). In other words, the input of the new address can be arbitrarily started at any administration level (item field) of the display of the address of the previously retrieved point, and proceed therefrom to lower administrative levels (smaller administrative units or districts). When the administrative district item field is clicked, the administrative district names are displayed in the form of a list in the order of the Japanese syllables on the right side of the item input page. Then, the user is prompted to select his/her desired administrative district name from the list, whereby the address of the new point is input.

When input of the address of the point is finished, retrieval of the new point (coordinates of the new point) is started (Step 3). After the new point is retrieved, data for the newly retrieved point, i.e., data items for each administrative district name of the newly retrieved point in the fields 1 through n, is stored in the unit 3 (Step 4). In other words, data related to the address of the newly retrieved point is stored in the unit 3 in a field-to-field (hierarchical) structure. This helps the user to input his/her desired address in a series of administrative district-to-district inputs, thus simplifying the process for inputting an address of a point.

Figure 4:
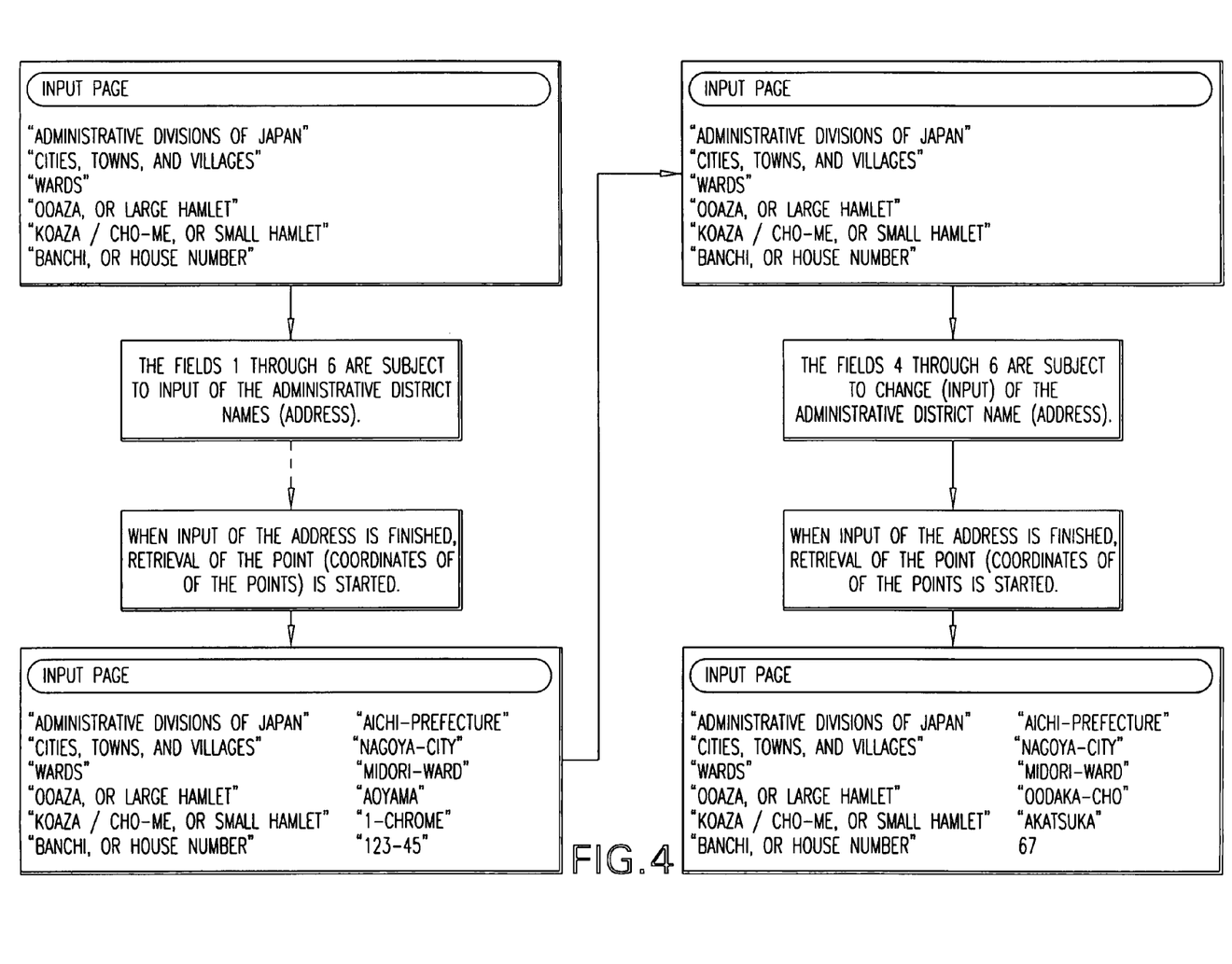
FIG. 4 is a flowchart of a process for inputting an address of a point to be retrieved according to the preferred embodiment of FIG. 1.

FIG. 4(a) shows the initial state of the input page. In its initial state, the left side of the input page displays a hierarchy of different administrative district levels (fields) while the right side of the input page is blank. Here, the number of the administrative district fields is six (n=6) and the fields 1 through 6 are presented for input of the administrative district names. As previously described, the input of the administrative district name in each field is done with a click. When an administrative field is clicked, the input page goes to the item input page for that field. In this item input page, the administrative district names are displayed in the form of a list on the right side. Then, the user is prompted to select his/her desired name of the administrative district from the list. This process of selection is repeated to administrative district item field n, and thereby the address of a point is input. When the input of the address is finished, retrieval of the point (coordinates of the point) is started. After the point is retrieved, data for the retrieved point, i.e., each item of data for the administrative district names/retrieved points is stored in the unit 3 in a field-to-field (hierarchical) structure.

For the next address input, the input page in its initial state displays, as shown in FIG. 4(b), the address that was input last time around. The address input page in its initial state helps to simplify the process of inputting a new address. For example, if the new address differs slightly from a previously input address at the administrative district level of "Ooaza, or a large hamlet," (a large collection of dwellings), "Koaza/Cho-me, or a small hamlet" (a small collection of dwellings), and "Banchi, or House number," the user is allowed to input the new address using the input page in its initial state, by changing only the names of "Koaza/Cho-me, or a small hamlet" (a small collection of dwellings), and "Banchi, or House number," as shown in FIG. 4(d), while leaving unchanged the names of "Administrative divisions of Japan" (the Tokyo metropolitan area, Hokkaido, and other prefectures), "Cities, Towns and Villages", and "Wards" just as they are in their initial state as shown in FIG. 4(c). When input of the address is finished, retrieval of a point (coordinates of the point) is started. After the point is retrieved, data for the address of the retrieved point, i.e., the items of data for each administrative district name (level) of the retrieved point is stored in the unit 3 in hierarchical form (i.e., on an administrative district-to-district basis).

To summarize, the map display device according to the present invention makes full use of the address that was input last time around, thus simplifying the process for inputting an address of a new point located near the previously retrieved point whose address was input last time, thereby facilitating point retrieval.

According to the present invention, data for the address of every previously retrieved point is stored in administrative district-to-district fields, i.e., in hierarchical form. This contributes to a simplification of the point retrieval; in other words, simplification of both the process of inputting the administrative district name and the process of selecting the administrative district name from the list. The description which follows illustrates examples of the simplified process for inputting the administrative district name and for selecting administrative district names from the list.

Figure 5:
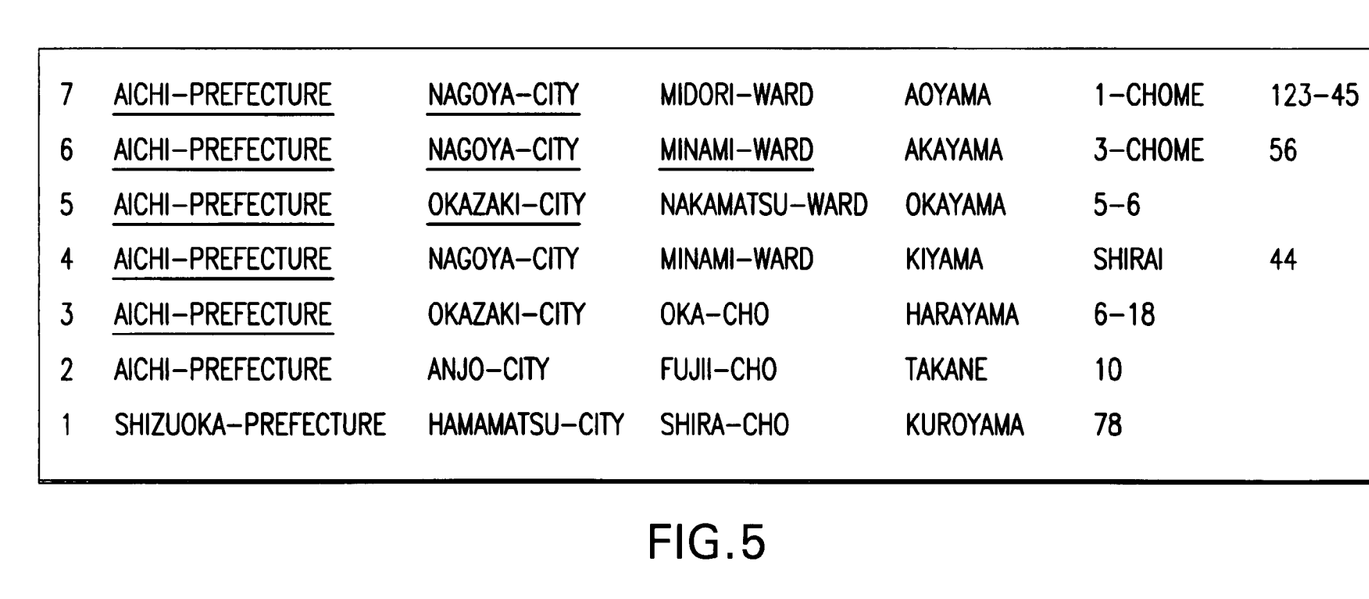
FIG. 5 shows a historic record of seven previously inputted addresses arranged in a hierarchy of five or six administrative levels.

FIG. 5 shows historic records of seven previously input addresses. As shown in FIG. 5, in the first use of the point retrieval system, "Shizuoka-prefecture, Hamamatsu-city, Shira-cho, Kuroyama 78" was input. In the second use of the point retrieval, "Aichi-prefecture, Anjo-city, Fujii-cho, Takane 10" was input. In the third and fourth application of the point retrieval, "Aichi-prefecture" was available from the address inputted in the second application. In the fifth application of the point retrieval, both "Aichi-prefecture" and "Okazaki-city" were available from the address input in the third application. In the sixth application of the point retrieval, "Aichi-prefecture," "Nagoya-city," and "Minami-ward" were available from the address input in the fourth application. In the seventh application of the point retrieval, "Aichi-prefecture" and "Nagoya-city" were available from the address input in the sixth application.

Figure 6:
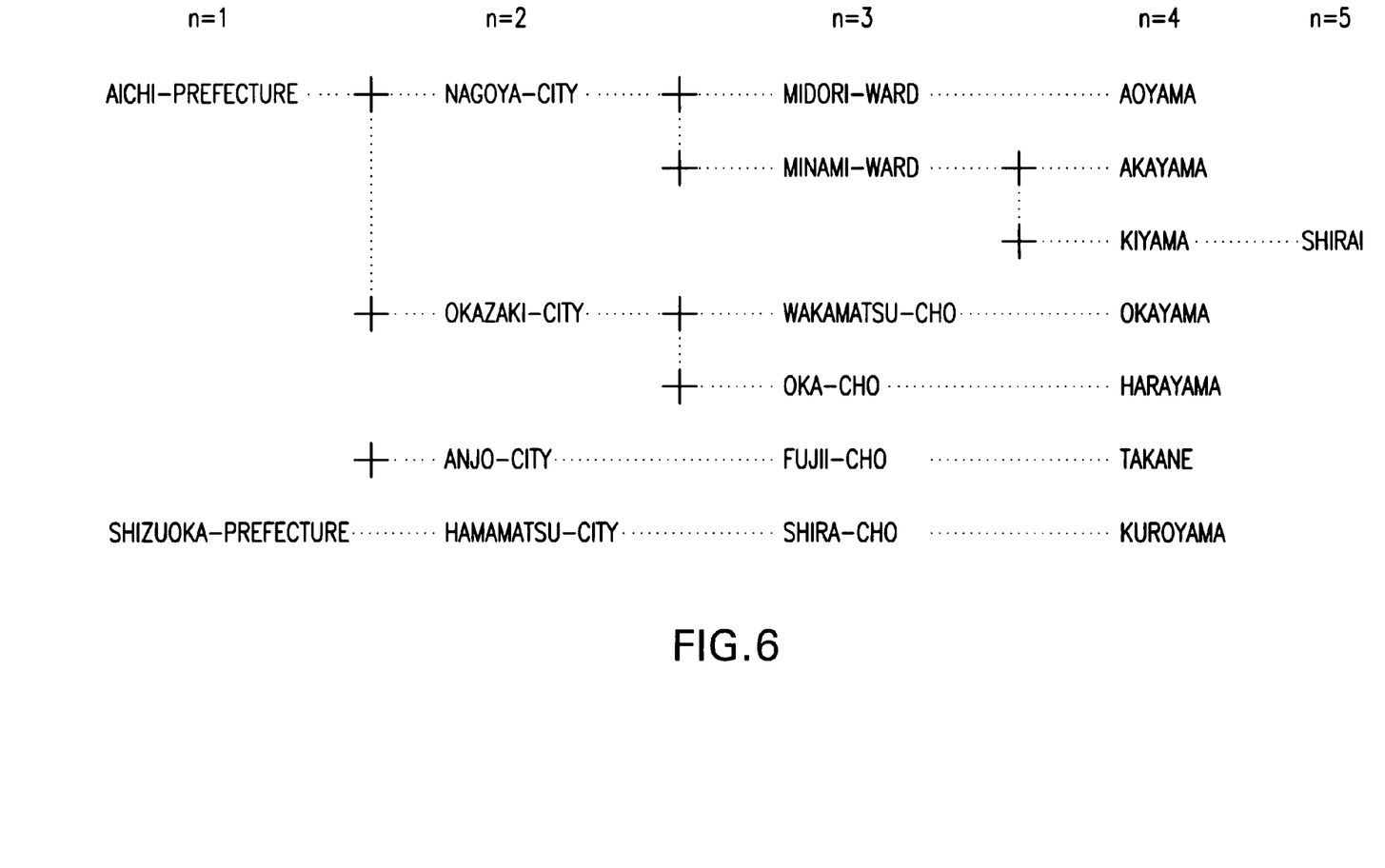
FIG. 6 illustrates the structure of the data for the historic records of the inputted addresses of the previously retrieved points shown in FIG. 5.

FIG. 6 illustrates data structure of the historic records of the inputted addresses of the previously retrieved points shown in FIG. 5. The data of the historic records takes the form of a tree-like structure in which data for the highest level administrative district is linked to data for lower level administrative districts (item fields). For example, "Aichi-prefecture" in the; administrative district field 1 is linked with "Nagoya-city," "Okazaki-city," and "Anjo-city" in the administrative district item field 2. "Nagoya-city" in the field 2 is linked with "Midori-ward" and "Minami-ward" in the administrative district field 3 "Okazaki-city" in the field 2 is linked with "Wakamatsu-cho" and "Oka-cho" in item field 3. "Anjo-city" in the field 2 is linked with "Fujii-cho" in item field 3. In the same manner as above, each item of data in field 3 is linked with data in the administrative district item field 4. Likewise, the data in field 4 is linked with data in the administrative district item field 5.

Such a data structure eliminates duplication of the same administrative district names in storage, thereby saving memory space in the map display device. This enables a limited memory space to store voluminous historic records of the inputted addresses of the previously retrieved points.

Figure 7A:
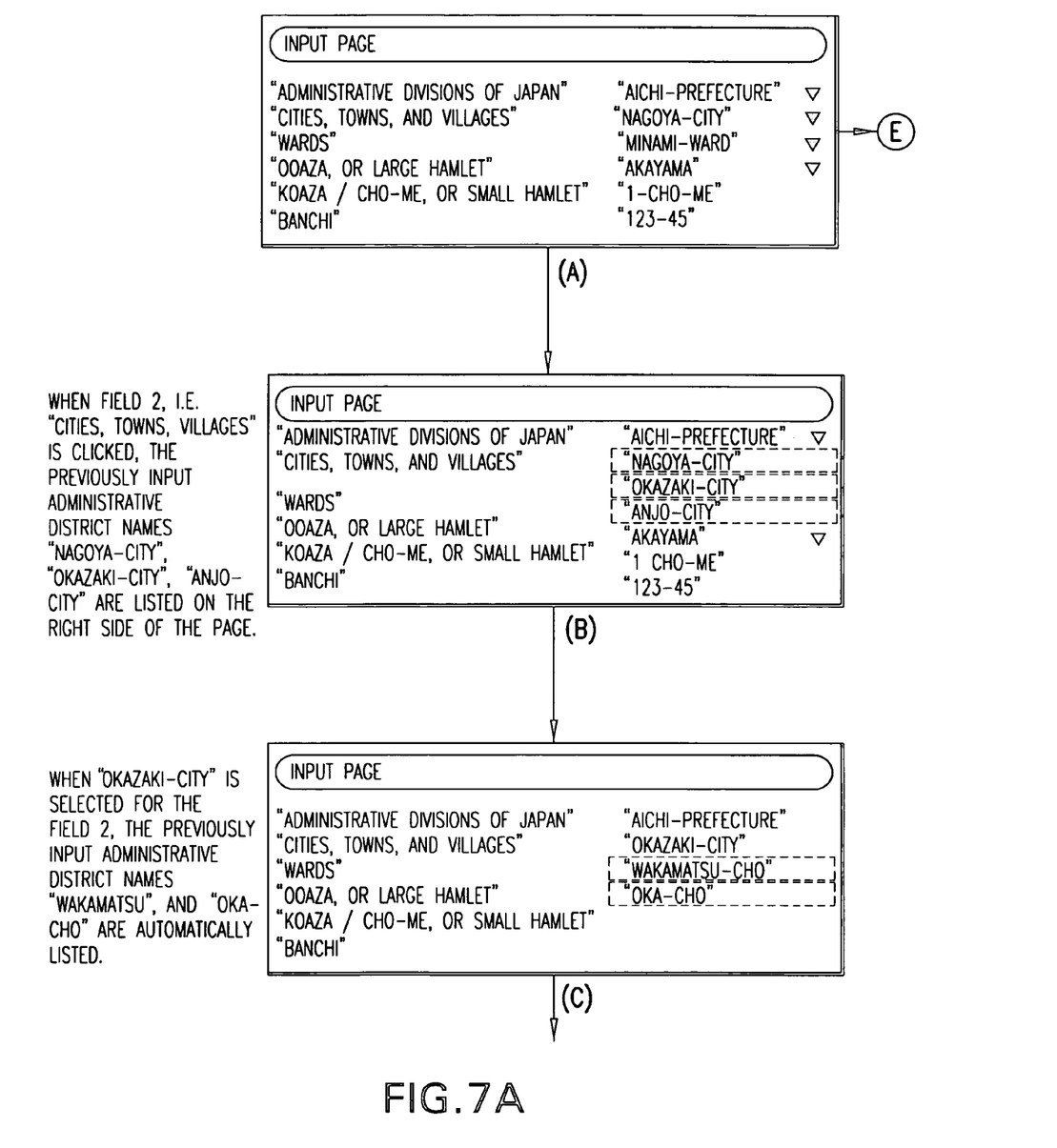
FIG. 7 is a flowchart of a process for inputting an address of a point to be retrieved based on the data structure shown in FIG. 6.
Figure 7B:
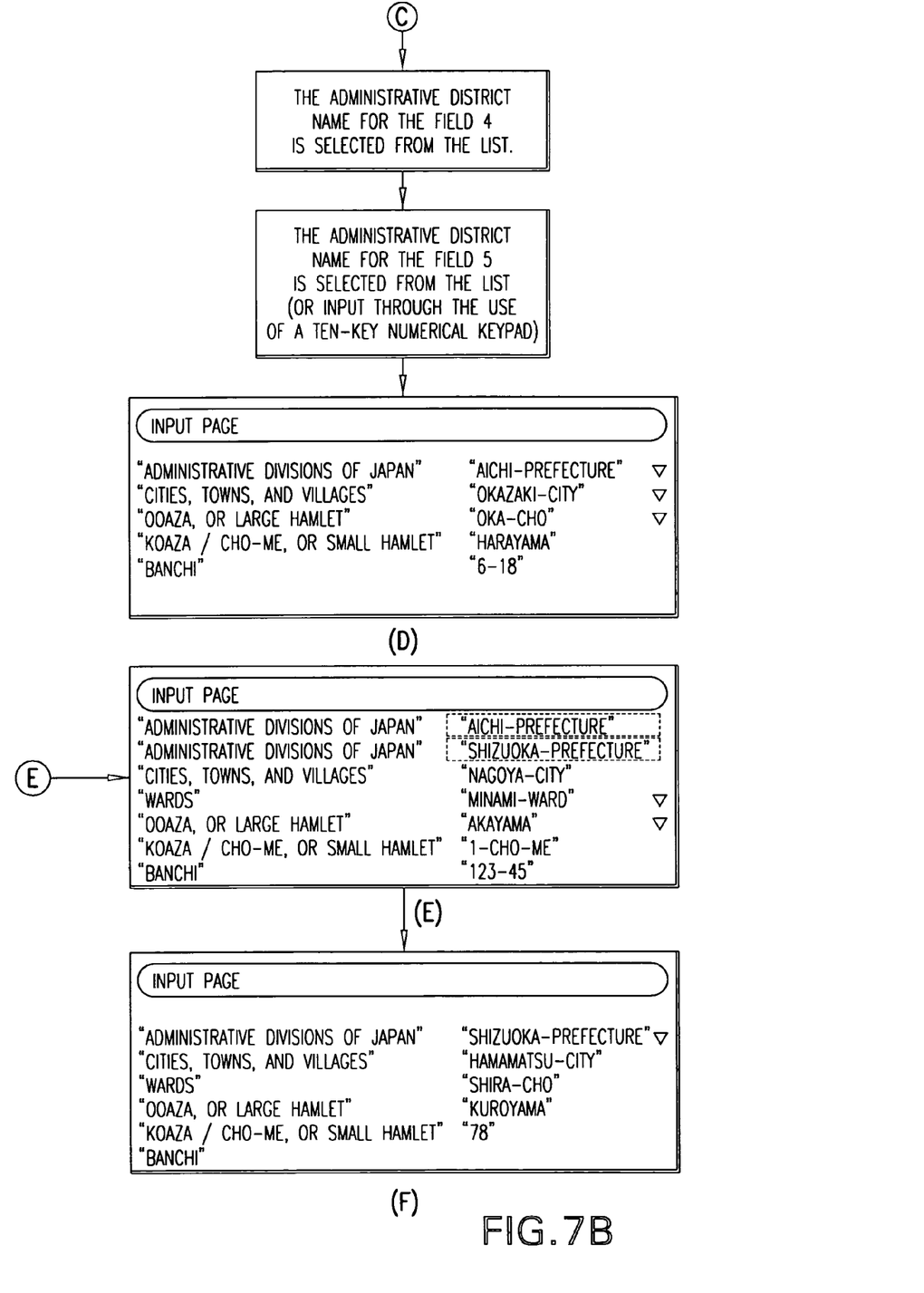

FIG. 7 illustrates a routine for inputting an address of a point to be retrieved based on the data structure shown in FIG. 6. FIG. 7(a) shows the initial state of the input page on which the historic records of the inputted address of the previously retrieved point are displayed. On this input page, a mark ▼ at the right end of the administrative district item field indicates that the field has a plurality of previously input administrative district names. In other words, the mark ▼ indicates that the historic records of the input addresses of the previously retrieved points allow the user to select his/her desired administrative district name therefrom. In FIG. 7(a), "Aichi-prefecture" is selected for the field 1 of "Administrative divisions of Japan". When the field 2 of "Cities, Towns and Villages" is clicked, the previously input administrative district names, "Nagoya-city," "Okazaki-city," and "Anjo-city" are listed on the right side of the item input page as shown in FIG. 7(b). When "Okazaki-city" is selected for the field 2, the previously input administrative district names for the field 3, "Wakamatsu-cho" and "Oka-cho," are automatically listed as shown in FIG. 7(c). When "Oka-cho" is selected for the field 3, in the same manner as above, the previously input administrative district names for the field 4 and the field 5 are sequentially displayed in the form of a list and the user is prompted to select his/her desired administrative district name from that list. Thus, the complete address is input as shown in FIG. 7(d).

In another example, when the field 1 of "Administrative divisions of Japan" is clicked, the previously input administrative district names, "Aichi-prefecture" and "Shizuoka-prefecture," are automatically listed on the right side of the item input page as shown in FIG. 7(e). When "Shizuoka-prefecture" is selected for the field 1, each of the lower administrative district names "Hamamatsu-city," "Shira-cho," "Kuroyama," and "78," are automatically and sequentially selected for each lower administrative district item field. Thus, the whole address is input as shown in FIG. 7(f). The automatic selection of the administrative district names is based on the historic records of the inputted addresses of the previously retrieved points.

As mentioned above, in some cases, selection of the upper administrative district name may cause automatic sequential input of the lower administrative district names based on the historic records of the input addresses of the previously retrieved points. If there is a plurality of administrative district names for one field, they are displayed in the form of a list so that the user can select his/her desired administrative district name from that list. If there is only one administrative district name for one field, it is automatically selected as the user-desired administrative district name and displayed in the field. Such automatic selection of the administrative district name can simplify the process of inputting thee address.

In other cases, the selection of the upper administrative district name is from a plurality of administrative district names for one lower administrative district item field below the selected upper administrative district item field. In this case, the latest record of the input address of the previously retrieved point, i.e., the administrative district name that was input last time around, is automatically selected for the lower administrative district item field. If such lower administrative district name according to the latest record is unwanted by the user, the other administrative district names for the lower administrative district item field are displayed one by one in the order in which they were input for the point retrieval.

In a case where an attempt is made to exchange address data between two computers that differ from each other, for example, between a map display device and a personal computer, the difference between the map display device and the personal computer may cause lack of data-portability between them. For example, assume that data stored in the personal computer is exported to the map display device. In this case, portability of the address data concerning the administrative district names is sometimes lost while the portability of coordinate data for the administrative districts is maintained.

Figure 8:
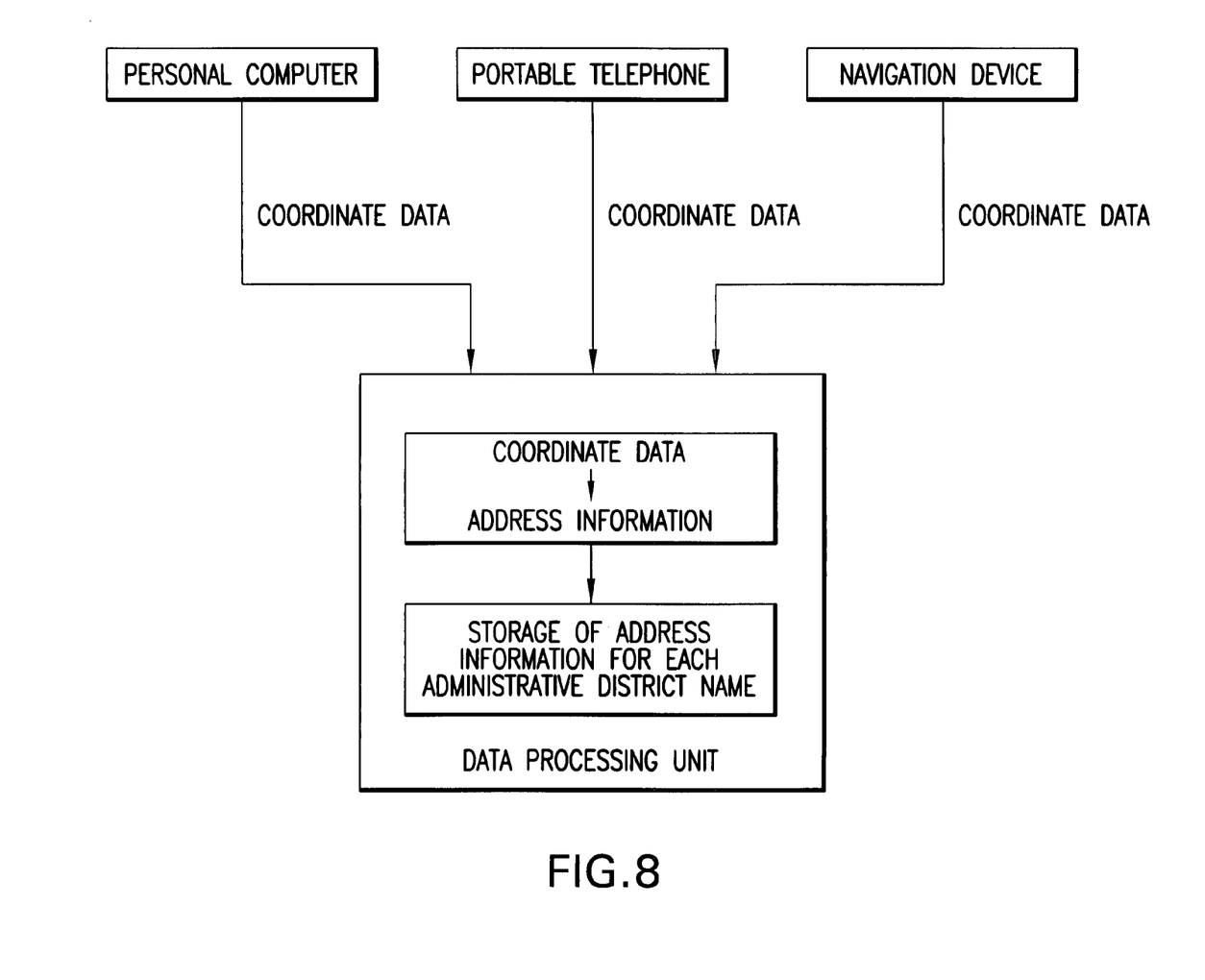
FIG. 8 is a block diagram illustrating data-portability between different systems by deriving address information from data imported from other systems.

In order to ensure full data-portability between different systems, as shown in FIG. 8, the data processing unit in the map display device according to the present invention is designed to derive address information from the coordinate data exported from other systems, for example, a personal computer, a portable telephone, a navigation device, etc. The derived address information serving as the address data for administrative district names is stored in the unit 3 and used in inputting the administrative district name into each administrative district item field. In such a way, the address data, i.e., the address information derived from the coordinate data, stored in other systems may be used in the map display device. This enhances the usefulness of the system of the present invention for inputting the address of a point to be retrieved.

FIG. 9 illustrates another preferred embodiment of a process of point retrieval based on addresses, according to the process of the present invention, involving the following steps.

Figure 9A:
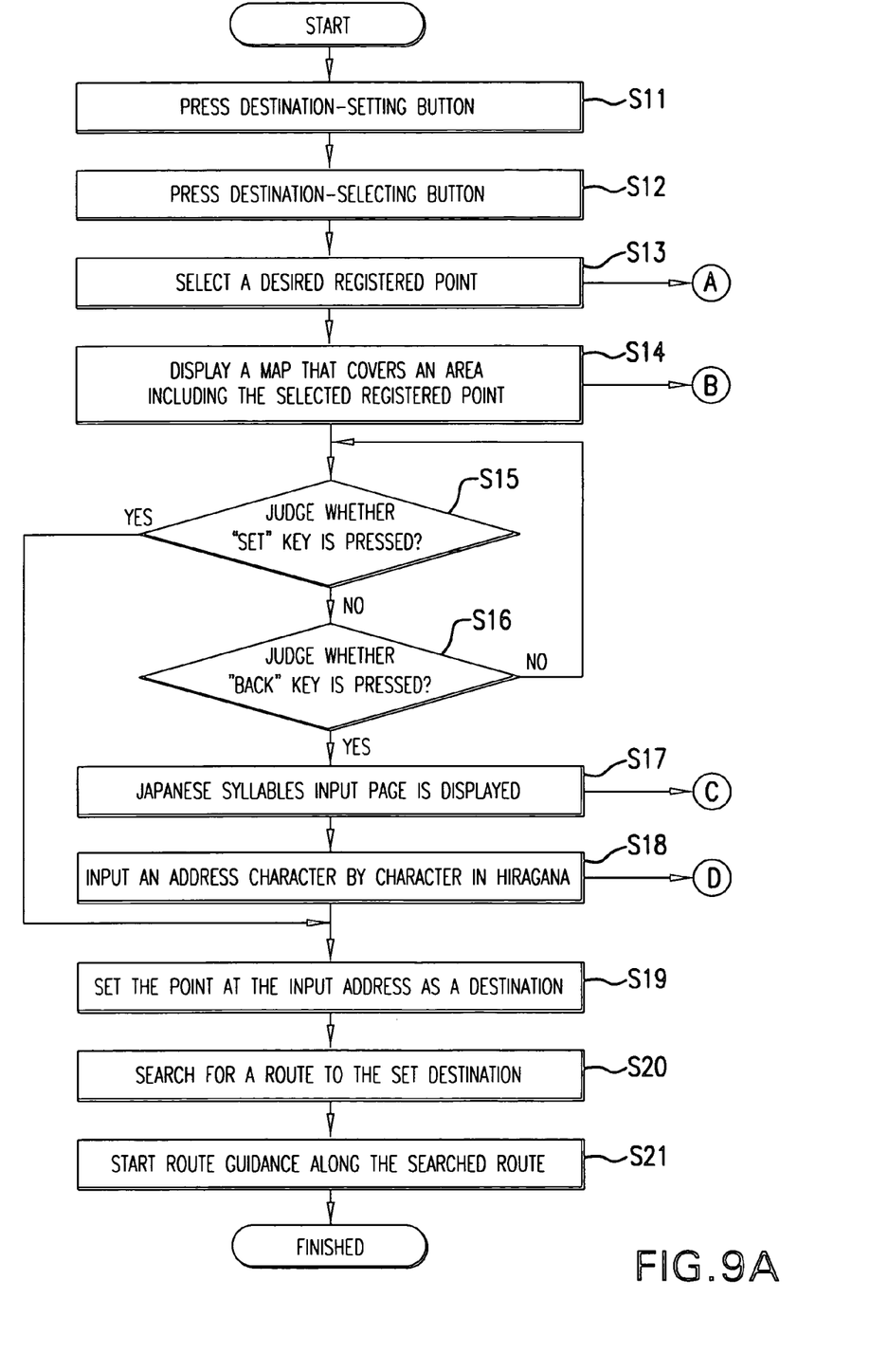
FIG. 9 is a flowchart of another process for point retrieval based on addresses, in accordance with the preferred embodiment.
Figure 9B:
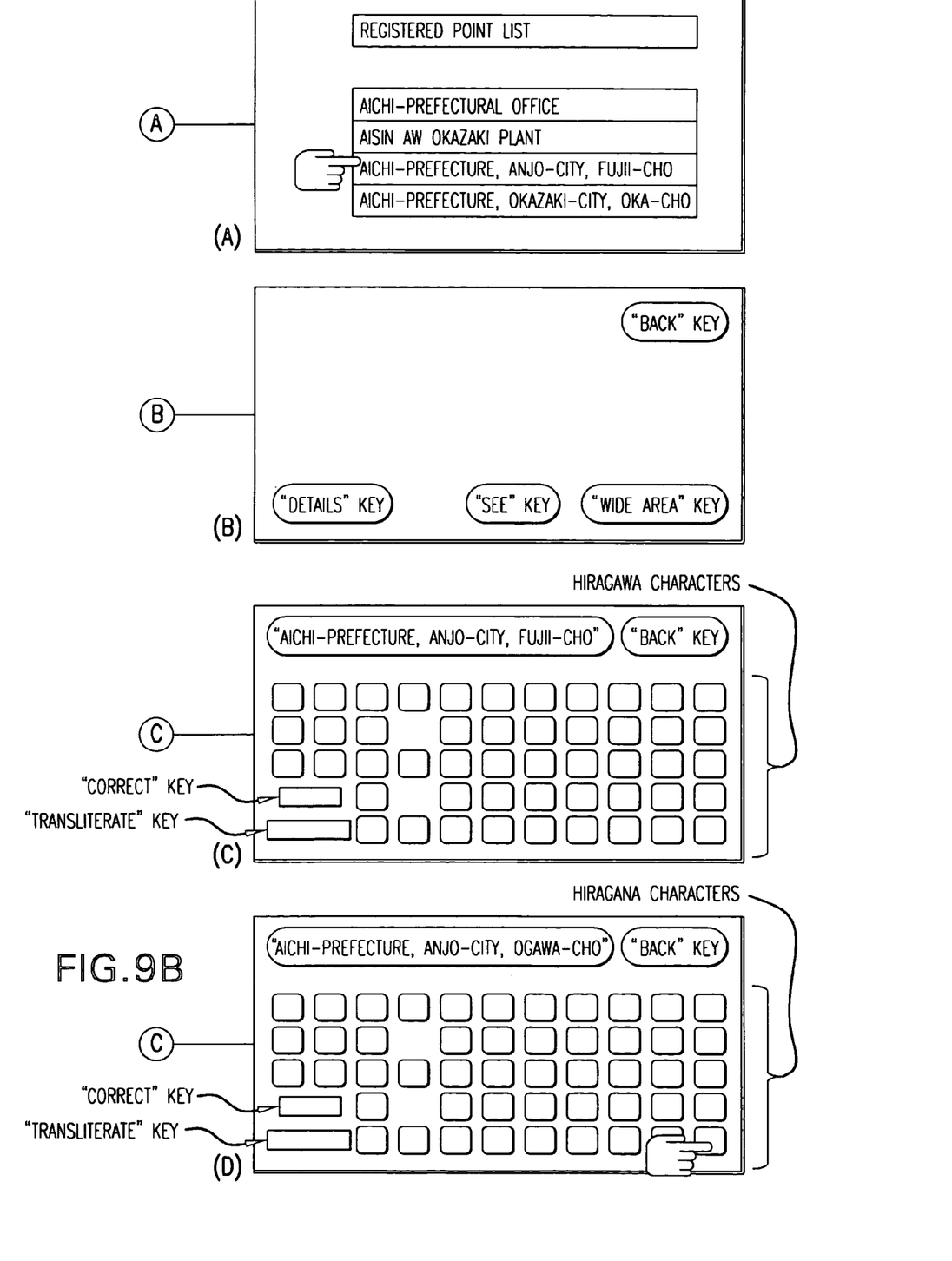

To begin the process, a destination-setting button provided on a menu page displayed on the map display device is pressed (Step S11). When the menu page goes to the next page, a destination-selecting button provided on that next page is pressed (Step S12). Upon pressing the destination-selecting button, a registered point list showing historic records of input addresses of the previously retrieved points is displayed as shown in FIG. 9(a). Then, a desired registered point is selected from the list (Step S13). Upon selection of the desired registered point from the list, a map that covers an area including the selected registered point is displayed, as shown in FIG. 9(b) (Step S14). The map as shown in FIG. 9(b) is provided with the following on-screen keys: a "Details" key for selecting display of a detailed map, a "Wide area" key for selecting display of a wide-area map, a "Back" key by which the display is returned to a previous page, and a "Set" key with which a destination is set.

In Step S15, a judgement is made whether the "Set" key has been pressed. When it is judged that the "Set" key has been pressed, the process goes to Step S19 and the desired registered point (selected in Step S13) is set as a destination. When it is judged that "Set" key has not been pressed, a judgement is made whether the "Back" key has been pressed (Step S16). If it is judged that "Back" key has been pressed, the display goes to the Japanese syllables input page as shown in FIG. 9(c) (Step S17). For example, when "Aichi-prefecture, Anjo-city, Fujii-cho" is selected from the registered point list shown in FIG. 9(a) in Step S13, "Aichi-prefecture, Anjo-city, Fujii-cho" is automatically displayed on the Japanese syllables input page as shown in FIG. 9(c). If the user wants to retrieve another address by changing "Fujii-cho" to "Ogawa-cho" for example, the "Correct" key provided on the Japanese syllables input page is operated to delete "Fujii-cho" on a character-by-character basis. When "Fujii-cho" is completely deleted, "Ogawa-cho" is inputted in hiragana characters (46 Japanese symbols which represent all sound combinations) from the Japanese syllables input page. Operation of the "Transliterate" key provided on the Japanese syllables input page causes "Ogawa-cho" in hiragana characters to be transliterated into kanji characters (Chinese character). After pressing the "Transliterate" key, the display goes to another page as shown in FIG. 9(d) (Step S18) and then "Aichi-prefecture, Anjo-city, Ogawa-cho" is set as a destination (Step S19). Upon setting of the destination, a route to the destination is searched (Step S20). Then, route guidance along the searched route is started (Step S21).

As understood from the above description of the second preferred process, the map display according to the present invention makes full use of historic records of the input addresses of the previously retrieved points, thus simplifying the process for inputting the address of a point located near the previously retrieved point, and thereby facilitating easy point retrieval.

The map display device according to the present invention may be an in-car map display device comprising present position detection means, input means, and communication means, wherewith the following processes are executed. When present position data, guide data, etc. are transmitted from the in-car map display device to a information center, the center searches for a route and sends back the determined ("searched") route together with guidance information therefor, etc., to the in-car map display device. Upon receipt of the searched route, the guide information therefor, etc., the map display device outputs them to the user.

The above-mentioned information center is provided with retrieval means, route search means, etc. contains cartographic data, address data, point data, and data for historic records of inputted address of the previously retrieved points stored in the form of the treelike chart as shown in FIG. 6. Receiving data related to point retrieval from the in-car map display device, the information center sends back to the in-car map display device, as shown in FIG. 7, information for an input page from which an address can be input based on an administrative hierarchy. Upon receipt of the information for the administrative districts from the information center, the in-car map display device calls up the input page. Upon clicking the left or right side of the administrative district item field provided on the input page, the information center starts to retrieve the address data and the data for historic records of the input address of the previously retrieved point. Then, the center sends back the retrieved data to the in-car map display device.

Thus, a point retrieval request from the in-car map display device prompts the information center to retrieve data necessary for the address input through the in-car map display device, thereby simplifying the process for inputting the address and thereby enhancing the usefulness of the address input system.

Accordingly, the present invention provides a map display device that makes full use of historic records of the inputted addresses of the previously retrieved points, thereby simplifying the process of inputting the address of a point located near a previously retrieved point and thereby facilitating easy point retrieval.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A map display device for retrieving a point at an inputted address and for displaying a map that covers the point retrieved for the inputted address, comprising:
   storage means for storing historic records of a plurality of input addresses of previously retrieved points based on a hierarchy of levels of administrative districts;
   control means for displaying an input page showing, as a menu, a hierarchy of levels of administrative districts for the input address of one of the previously retrieved points and for input of a different address by selection of any arbitrary level within the displayed hierarchy of levels, the one address being selected on the basis of the stored historic records of the plurality of input addresses.

2. The map display device according to claim 1, wherein the administrative district name of the previously retrieved point is that last input.

3. The map display device according to claim 1, wherein the administrative district name of the previously retrieved point is that last input the greatest number of times among the administrative district names of the previously retrieved points.

4. The map display device according to claim 1, wherein the address of the retrieved point is that set as a destination.

5. The map display device according to claim 1 further comprising:
   selection means for selecting an administrative district name at one level of the hierarchy of the one previously retrieved point, and wherein, responsive to the selection of the administrative district name of the one previously retrieved point, names of lower level administrative districts, below the level of the selected administrative district name, are automatically displayed by the control means.

6. The map display device according to claim 2 further comprising:
   selection means for selecting an administrative district name at one level of the hierarchy of the one previously retrieved point, and wherein, responsive to the selection of the administrative district name of the one previously retrieved point, names of lower level administrative districts, below the level of the selected administrative district name, are automatically displayed by the control means.

7. The map display device according to claim 3 further comprising:
   selection means for selecting an administrative district name at one level of the hierarchy of the one previously retrieved point, and wherein, responsive to the selection of the administrative district name of the one previously retrieved point, names of lower level administrative districts, below the level of the selected administrative district name, are automatically displayed by the control means.

8. The map display device according to claim 4 further comprising:
   selection means for selecting an administrative district name at one level of the hierarchy of the one previously retrieved point, and wherein, responsive to the selection of the administrative district name of the one previously retrieved point, names of lower level administrative districts, below the level of the selected administrative district name, are automatically displayed by the control means.

9. The map display device according to claim 1, wherein the control means automatically displays the names of the administrative districts for the levels below the one selected level in the form of a list, based on the stored historic records.

10. A map display device for retrieving a point at an inputted address and for displaying a map that covers the point retrieved for the input address, comprising:
    storage means for storing information for a plurality of previously retrieved points; and
    control means for reading out historic records of the input addresses of previously retrieved points and for displaying them in the form of a list, and for, responsive to selection of an address of a previously retrieved point from the list, displaying an input page with an address of the selected previously retrieved point displayed as a selection menu on the input page as a hierarchy of different administrative levels.

11. The map display device according to claim 10, wherein a map that covers the previously retrieved point at the selected address is displayed, and further wherein the map changes to the input page responsive to a request for a change of the selected address.

12. The map display device according to claim 10, wherein the stored information for the retrieved point is an address of a registered point.

13. A computer readable medium encoded with a computer program for a map display device for retrieving a point at an inputted address and for displaying a map that covers the point retrieved for the inputted address, and encoded with historic records of previously input addresses for retrieved points, arranged in a hierarchy of administrative district levels, and wherein said program comprises:

displaying an input page for input of an address as a hierarchy of levels of administrative districts and displaying at least one administrative district name as a hierarchy of different administrative levels as a menu of item fields for selection.

14. A computer readable medium according to claim 13 wherein the encoded program further comprises:

prompting selection of any one of the item fields in the address of the one administrative district name of a previously retrieved point; and     displaying names of administrative districts in item fields below the selected one item field responsive to the selection.

15. A computer readable medium encoded with a computer program for a map display device for retrieving a point at an input address and for displaying a map that covers the point retrieved for the inputted address, and with information for the retrieved point wherein said program comprises:

retrieving historic records of input addresses for previously retrieved points;

displaying the retrieved historic records in the form of a list for selection of an address of a previously retrieved point;

displaying an input page showing a selected previously retrieved point with its address presented on the input page as a hierarchy of different administrative levels;

prompting selection of any one of the administrative levels of the one administrative district name of a previously retrieved point; and     displaying names of administrative levels below the selected one administrative level.

\* \* \* \* \*